US010156743B1

United States Patent
Lin et al.

(10) Patent No.: US 10,156,743 B1
(45) Date of Patent: Dec. 18, 2018

(54) DYNAMIC DRIVING METHOD OF TRI-STABLE CHOLESTERIC LIQUID CRYSTALS

(71) Applicant: National Sun Yat-sen University, Kaohsiung (TW)

(72) Inventors: Tsung-Hsien Lin, Kaohsiung (TW); Cheng-Chang Li, Kaohsiung (TW); Hung-Chang Jau, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 15/806,351

(22) Filed: Nov. 8, 2017

(51) Int. Cl.
   *G02F 1/133* (2006.01)
   *G02F 1/137* (2006.01)

(52) U.S. Cl.
   CPC ...... *G02F 1/13306* (2013.01); *G02F 1/13718* (2013.01)

(58) Field of Classification Search
   CPC ... G02F 1/13306; G02F 1/13718; G09G 3/36; G02B 5/3016
   See application file for complete search history.

(56) References Cited

U.S. PATENT DOCUMENTS

| 2007/0008262 | A1 | 1/2007 | Harada et al. |
| 2007/0268416 | A1* | 11/2007 | Harada ............... G02F 1/1354 349/2 |
| 2011/0210953 | A1 | 9/2011 | Nose et al. |
| 2012/0140133 | A1 | 6/2012 | Choi et al. |
| 2016/0298031 | A1 | 10/2016 | Tuffin et al. |

* cited by examiner

*Primary Examiner* — Abbas I Abdulselam
(74) *Attorney, Agent, or Firm* — Soroker Agmon Nordman

(57) ABSTRACT

A dynamic driving method of tri-stable cholesteric liquid crystals is described, and used to switch a planar arrangement stable state, a focal-conic arrangement stable state, and an uniform lying helix arrangement stable state of a cholesteric liquid crystal material by a two-stage selecting step. A switching time among the three stable states driven by a passive matrix method is effectively reduced.

10 Claims, 7 Drawing Sheets

DYNAMIC DRIVING METHOD OF TRI-STABLE CHOLESTERIC LIQUID CRYSTALS

FIELD OF THE DISCLOSURE

The present disclosure relates to a driving method of cholesteric liquid crystals, and more particularly to a dynamic driving method of tri-stable cholesteric liquid crystals.

BACKGROUND OF THE DISCLOSURE

Cholesteric liquid crystals are a material with a periodic helical arrangement. When chiral axes of the cholesterol liquid crystals are aligned perpendicularly to a substrate, it is referred to as a planar structure (or a planar arrangement stable state). The planar structure has a reflective characteristic depending on a period. Furthermore, when the chiral axes of the cholesterol liquid crystals are aligned irregularly, it is referred to as a focal-conic structure (or a focal-conic arrangement stable state). The focal-conic structure has a characteristic of scattering light.

It is noted that the planar structure and the focal-conic structure are both stable states, and researchers fabricate display screens, based on the characteristics of these structures accordingly. Therefore, this type of display screen is also referred to as bi-stable cholesterol liquid crystal display screen.

Furthermore, the cholesteric liquid crystals, including other structures with stable states, were discovered by other researches in recent years. For example, the cholesteric liquid crystals have a transparent stable state with optically uniaxial crystals, and the transparent stable state is also referred to as a uniform lying helix (ULH) stable state. In other words, the cholesterol liquid crystals can exchange among the three kinds of stable states, but there is no literature to provide a driving method of the three stable states of the cholesterol liquid crystals at this time.

Furthermore, the cholesteric liquid crystals usually require a relatively high driving voltage and are difficult to apply in liquid crystal panels. In another aspect, in view of liquid crystal panels driven inactively, a relatively high switching time is required for switching the stable states of the cholesteric liquid crystals, so there is still room for improvement.

As a result, it is necessary to provide a driving method of cholesteric liquid crystals to solve the problems existing in the conventional technologies, as described above.

SUMMARY OF THE DISCLOSURE

An object of the present disclosure is to provide a dynamic driving method of tri-stable cholesteric liquid crystals, which is used to switch three stable states of a cholesteric liquid crystal material by a two-stage selecting step.

Another object of the present disclosure is to provide a dynamic driving method of tri-stable cholesteric liquid crystals, which enables the cholesteric liquid crystal material to be in a transition zone between a uniform lying helix arrangement stable state and a vertical alignment unstable state, such that a switching time among the three stable states can be reduced.

To achieve the above object, the present disclosure provides a dynamic driving method of tri-stable cholesteric liquid crystals, that includes: a tri-stable cholesteric liquid crystal device is provided and includes a cholesteric liquid crystal material with at least three stable states; and chiral molecules, wherein the at least three stable states includes a planar arrangement stable state, a focal-conic arrangement stable state, and an uniform lying helix arrangement stable state; a first preparing step is performed, wherein a first voltage is applied to the cholesteric liquid crystal material for 1.5 to 2.5 seconds, such that the cholesteric liquid crystal material is in the uniform lying helix arrangement stable state; a second preparing step is performed, wherein a second voltage is applied to the cholesteric liquid crystal material for 1 to 3 milliseconds, such that the cholesteric liquid crystal material is in a transition zone between the uniform lying helix arrangement stable state and a vertical alignment unstable state, wherein the second voltage is greater than the first voltage; a first selecting step is performed to select one of the uniform lying helix arrangement stable state and the vertical alignment unstable state as a first selecting result, wherein; when the first selecting result is the uniform lying helix arrangement stable state, a third voltage is applied to the cholesteric liquid crystal material for 5 to 12 milliseconds, such that the cholesteric liquid crystal material returns to the uniform lying helix arrangement stable state from the transition zone, wherein the third voltage is less than the second voltage; or when the first selecting result is the vertical alignment unstable state, the second voltage is further applied to the cholesteric liquid crystal material for 2 to 4 milliseconds, such that the cholesteric liquid crystal material transforms into the vertical alignment unstable state, and then a second selecting step is performed to select one of the planar arrangement stable state and the focal-conic arrangement stable state as a second selecting result, wherein: when the second selecting result is the focal-conic arrangement stable state, a fourth voltage is applied to the cholesteric liquid crystal material for 3 to 8 milliseconds, such that the cholesteric liquid crystal material transforms into the focal-conic arrangement stable state from the vertical alignment unstable state, wherein the fourth voltage is less than the second voltage; or when the second selecting result is the planar arrangement stable state, the second voltage is further applied to the cholesteric liquid crystal material for 3 to 8 milliseconds, such that the cholesteric liquid crystal material transforms into the planar arrangement stable state from the vertical alignment unstable state.

In one embodiment of the present disclosure, the first voltage ranges from 20 V to 30 V, the second voltage ranges from 61 V to 71 V, the third voltage ranges from 16 V to 26 V, and the fourth voltage ranges from 16 V to 60 V.

In one embodiment of the present disclosure, the first voltage is 21 V and the second voltage is 71 V.

In one embodiment of the present disclosure, in the first selecting step, when the first selecting result is the uniform lying helix arrangement stable state, the third voltage is applied to the cholesteric liquid crystal material for 5 milliseconds, and a fifth voltage is further applied to the cholesteric liquid crystal material for 5 milliseconds, such that the cholesteric liquid crystal material returns to the uniform lying helix arrangement stable state from the transition zone, wherein the third voltage is 21 V and the fifth voltage ranges from 11 V to 36 V.

In one embodiment of the present disclosure, the fifth voltage is 21 V.

In one embodiment of the present disclosure, in the second selecting step, when the second selecting result is the focal-conic arrangement stable state, the fourth voltage is applied to the cholesteric liquid crystal material for 3 milliseconds and a fifth voltage is further applied to the cholesteric liquid crystal material for 5 milliseconds, such that the cholesteric liquid crystal material transforms into the focal-conic arrangement stable state from the vertical alignment unstable state, wherein the fourth voltage is 21 V and the fifth voltage ranges from 11 V to 36 V.

In one embodiment of the present disclosure, the fifth voltage is 21 V.

In one embodiment of the present disclosure, in the second selecting step, when the second selecting result is the planar arrangement stable state, the second voltage is applied to the cholesteric liquid crystal material for 3 milliseconds and a fifth voltage is further applied to the cholesteric liquid crystal material for 5 milliseconds, such that the cholesteric liquid crystal material transforms into the planar arrangement stable state from the vertical alignment unstable state, wherein the fifth voltage ranges from 11 V to 36 V.

In one embodiment of the present disclosure, the fifth voltage is 21 V.

In one embodiment of the present disclosure, the chiral molecules are selected from a group consisting of chiral molecules S811, chiral molecules R811, chiral molecules S1011, chiral molecules R1011, chiral molecules S5011, and chiral molecules R5011.

DETAILED DESCRIPTION OF THE PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

Figure 1:
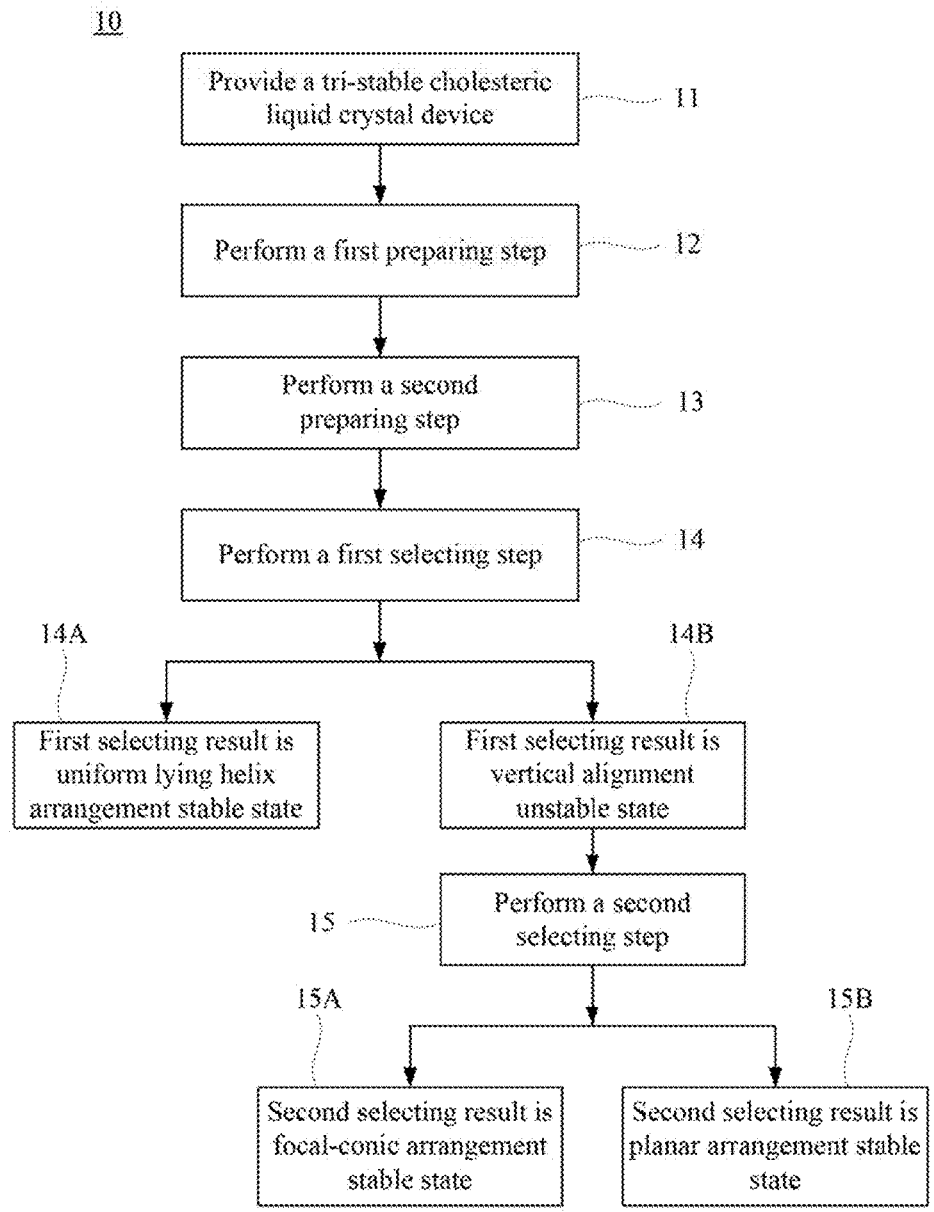
FIG. 1 is a flowchart illustrating a dynamic driving method of tri-stable cholesteric liquid crystals according to one embodiment of the present disclosure.

FIG. 1 illustrates a dynamic driving method 10 of tri-stable cholesteric liquid crystals, including: a tri-stable cholesteric liquid crystal device is provided and includes a cholesteric liquid crystal material with at least three stable states; and chiral molecules, wherein the at least three stable states includes a planar arrangement stable state, a focal-conic arrangement stable state, and an uniform lying helix arrangement stable state (step 11); a first preparing step is performed, wherein a first voltage is applied to the cholesteric liquid crystal material for 1.5 to 2.5 seconds, such that the cholesteric liquid crystal material is in the uniform lying helix arrangement stable state (step 12); a second preparing step is performed, wherein a second voltage is applied to the cholesteric liquid crystal material for 1 to 3 milliseconds, such that the cholesteric liquid crystal material is in a transition zone between the uniform lying helix arrangement stable state and a vertical alignment unstable state, wherein the second voltage is greater than the first voltage (step 13); a first selecting step is performed to select one of the uniform lying helix arrangement stable state and the vertical alignment unstable state as a first selecting result, wherein: when the first selecting result is the uniform lying helix arrangement stable state, a third voltage is applied to the cholesteric liquid crystal material for 5 to 12 milliseconds, such that the cholesteric liquid crystal material returns to the uniform lying helix arrangement stable state from the transition zone, wherein the third voltage is less than the second voltage; or when the first selecting result is the vertical alignment unstable state, the second voltage is further applied to the cholesteric liquid crystal material for 2 to 4 milliseconds, such that the cholesteric liquid crystal material transforms into the vertical alignment unstable state, and then a second selecting step is performed to select one of the planar arrangement stable state and the focal-conic arrangement stable state as a second selecting result, wherein: when the second selecting result is the focal-conic arrangement stable state, a fourth voltage is applied to the cholesteric liquid crystal material for 3 to 8 milliseconds, such that the cholesteric liquid crystal material transforms into the focal-conic arrangement stable state from the vertical alignment unstable state, wherein the fourth voltage is less than the second voltage; or when the second selecting result is the planar arrangement stable state, the second voltage is further applied to the cholesteric liquid crystal material for 3 to 8 milliseconds, such that the cholesteric liquid crystal material transforms into the planar arrangement stable state from the vertical alignment unstable state (step 14). The implementation details of the above-described steps and the principles thereof will be described in detail below.

In one embodiment of the present disclosure, the method 10 of the dynamic driving method 10 of the tri-stable cholesteric liquid crystals has step 11 that: a tri-stable cholesteric liquid crystal device is provided and includes a cholesteric liquid crystal material with at least three stable states; and chiral molecules, wherein the at least three stable states includes a planar arrangement stable state, a focal-conic arrangement stable state, and an uniform lying helix arrangement stable state. In step 11, the cholesteric liquid crystal material can be such as a positive type cholesteric liquid crystal material or a negative type cholesteric liquid crystal material, in one embodiment, the chiral molecules are selected from a group consisting of chiral molecules S811, chiral molecules R811, chiral molecules S1011, chiral molecules R1011, chiral molecules S5011, and chiral molecules R5011. Molecular formulas of the chiral molecules are shown as follows:

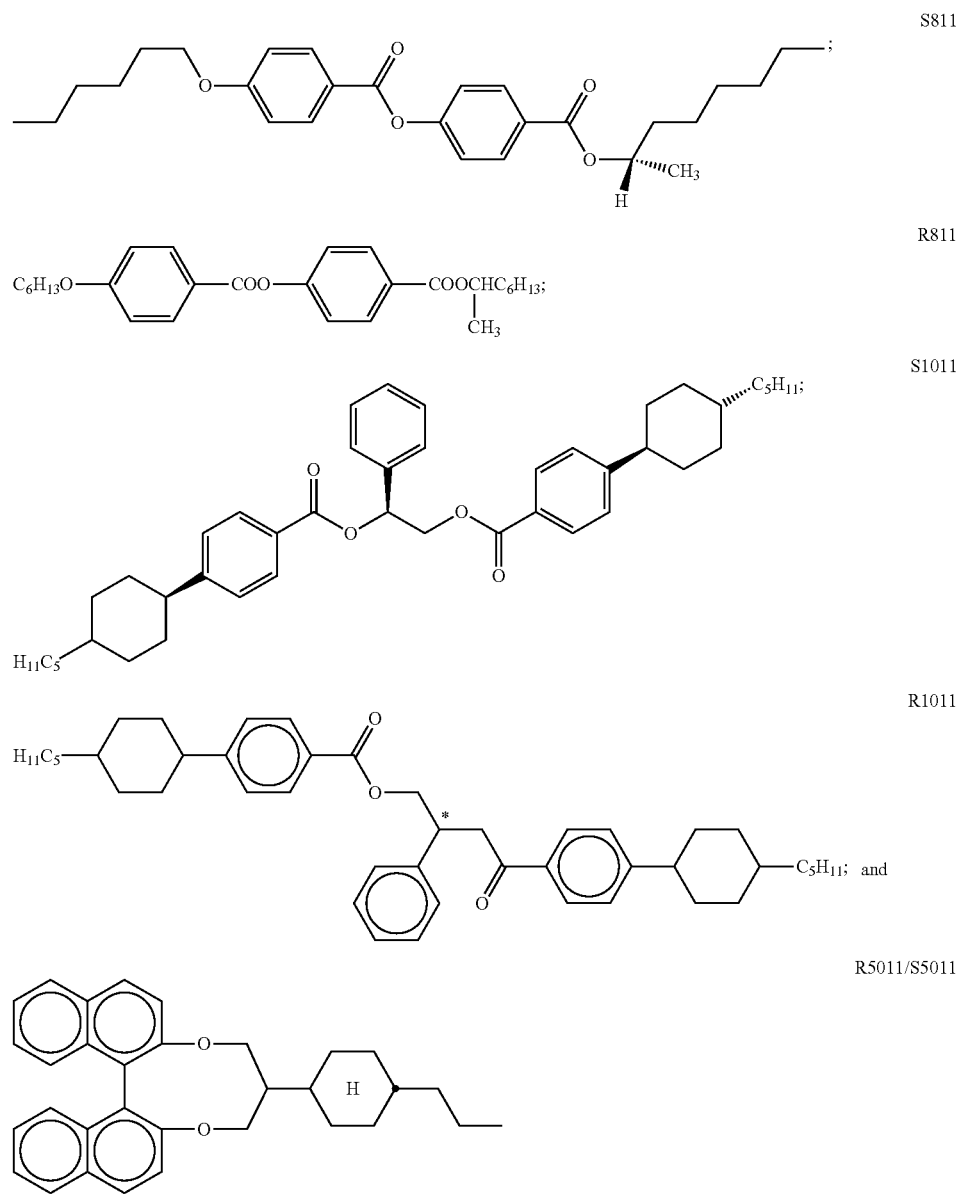

In one embodiment, the cholesteric liquid crystal device can include two electrodes, and the cholesteric liquid crystal material and the chiral molecules are disposed between the two electrodes. In a specific example, a power is applied to the two electrodes to provide a voltage to the cholesteric liquid crystal material, such that stable states of the cholesteric liquid crystal material can be changed or switched.

Then, the dynamic driving method 10 of the tri-stable cholesteric liquid crystals has step 12 as follows: a first preparing step is performed, wherein a first voltage is applied to the cholesteric liquid crystal material for 1.5 to 2.5 seconds, such that the cholesteric liquid crystal material is in the uniform lying helix arrangement stable state. In step 12, the first preparing step is mainly used to make the stable states of the cholesteric liquid crystal material uniform, i.e., regardless of the current stable states of the cholesteric liquid crystal material, the first voltage is applied first so that the cholesteric liquid crystal material is in the uniform lying helix arrangement stable state. In one embodiment, the first voltage ranges from about 20 V to about 30V, such as 21 V, 22 V, 23 V, 25 V, 27 V, or 29 V.

Then, the dynamic driving method 10 of the tri-stable cholesteric liquid crystals has step 13 as follows: a second preparing step is performed, wherein a second voltage is applied to the cholesteric liquid crystal material for 1 to 3 milliseconds, such that the cholesteric liquid crystal material is in a transition zone between the uniform lying helix arrangement stable state and a vertical alignment unstable state, wherein the second voltage is greater than the first voltage. In step 13, a state of the cholesteric liquid crystal material is mainly located at the transition zone so as to facilitate switching the stable states of the cholesteric liquid crystal material. It is noted that, the vertical alignment unstable state is a precursor state which the cholesteric liquid crystal material forms the planar arrangement stable state or the focal-conic arrangement stable state. In other words, when the cholesteric liquid crystal material is in the transition zone, the cholesteric liquid crystal material has been in a stable state selecting zone. A selecting method in the stable state selecting zone will be described in detail in the following step 14. In one embodiment, the second voltage ranges from about 61 V to about 71V, such as 62 V, 64 V, 66 V, 67 V, 69 V, or 70 V.

Then, the dynamic driving method 10 of the tri-stable cholesteric liquid crystals has step 14 as follows: a first selecting step is performed to select one of the uniform lying helix arrangement stable state and the vertical alignment unstable state as a first selecting result, wherein: when the first selecting result is the uniform lying helix arrangement stable state (such as step 14A), a third voltage is applied to the cholesteric liquid crystal material for 5 to 12 milliseconds, such that the cholesteric liquid crystal material returns to the uniform lying helix arrangement stable state from the transition zone, wherein the third voltage is less than the second voltage; or when the first selecting result is the vertical alignment unstable state (such as step 14B), the second voltage is further applied to the cholesteric liquid crystal material for 2 to 4 milliseconds, such that the cholesteric liquid crystal material transforms into the vertical alignment unstable state, and then a second selecting step is performed to select one of the planar arrangement stable state and the focal-conic arrangement stable state as a second selecting result (such as step 15), wherein: when the second selecting result is the focal-conic arrangement stable state (such as step 15A), a fourth voltage is applied to the cholesteric liquid crystal material for 3 to 8 milliseconds, such that the cholesteric liquid crystal material transforms into the focal-conic arrangement stable state from the vertical alignment unstable state, wherein the fourth voltage is less than the second voltage; or when the second selecting result is the planar arrangement stable state (such as step 15B), the second voltage is further applied to the cholesteric liquid crystal material for 3 to 8 milliseconds, such that the cholesteric liquid crystal material transforms into the planar arrangement stable state from the vertical alignment unstable state. In step 14, a stable state to be formed is selected from the three stable states by the first selecting step and the second selecting step. For example, if the cholesteric liquid crystal material is selected to transform being in the focal-conic arrangement stable state, the vertical alignment unstable state is firstly selected in the first selecting step and then the focal-conic arrangement stable is selected in the second selecting step. In one embodiment, the third voltage ranges from about 16 V to 26 V, and the fourth voltage ranges from about 16 V to 60 V.

From above, the present disclosure provides a method used to switch three stable states of a cholesteric liquid crystal material by a two-stage selecting step. Specifically speaking, a suitable voltage (i.e., the first voltage) is applied to the cholesteric liquid crystal material in the first preparing step for being in the uniform lying helix arrangement stable state. Then, the second voltage is applied to the cholesteric liquid crystal material in the second preparing step for being in the transition zone between the uniform lying helix arrangement stable state and the vertical alignment unstable state. Then, the cholesteric liquid crystal material is adjusted to be in the planar arrangement stable state, the focal-conic arrangement stable state, or the uniform lying helix arrangement stable state, according to the first selecting result and/or the second selecting result.

It is noted that, a dynamic driving method of tri-stable cholesteric liquid crystals according to one embodiment of the present disclosure can further reduce a switching time when the stable states of the cholesteric liquid crystal material are switched. Specifically speaking, it can be known that when determining whether or not the stable states of the cholesteric liquid crystal material are to be switched, it can be only determined in the first selecting step and in the second selecting step, according to the dynamic driving method of the tri-stable cholesteric liquid crystals of the present disclosure. Further, it can be known in the first selecting step and in the second selecting step, a spent time (or a switching time) of the cholesteric liquid crystal material forming each of the three stable states (including the planar arrangement stable state, the focal-conic arrangement stable state, and the uniform lying helix arrangement stable state) ranges from about 5 to about 12 milliseconds. In other words, the cholesteric liquid crystal material can be maintained in the transition zone between the uniform lying helix arrangement stable state and the vertical alignment unstable state, prior to determining the stable states of the cholesteric liquid crystal material. Then, only 5 to 12 milliseconds are spent to switch the stable states of the cholesteric liquid crystal material.

Figure 2:
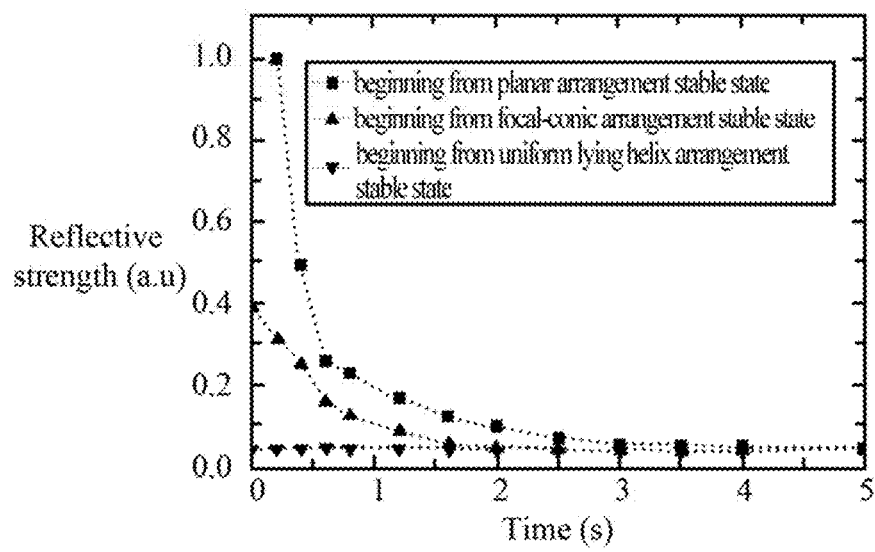
FIG. 2 is a schematic diagram illustrating reflective strength changing over time, after applying a first voltage to different stable states of a cholesteric liquid crystal material.

Feasibility of the dynamic driving method of the tri-stable cholesteric liquid crystals according to one embodiment of the present disclosure is described below. In general, the planar arrangement stable state has the greatest reflectivity in the three stable states (due to having a light-reflecting characteristic); the focal-conic arrangement stable state has a secondary reflectivity in the three stable states (due to having a light-scattering characteristic); and the uniform lying helix arrangement stable state has the smallest reflectivity in the three stable states (due to having a lighttransmitting characteristic). FIG. 2 is a schematic diagram illustrating reflective strength changing over time, after applying a first voltage to different stable states of a cholesteric liquid crystal material. FIG. 2 illustrates that, whether the cholesteric liquid crystal material is in the planar arrangement stable state, the focal-conic arrangement stable state, or the uniform lying helix arrangement stable state, the reflectivity of the cholesteric liquid crystal material is generally close to the zero axis after applying a first voltage for about 1.5 seconds. It can thus be proved that the step 12 of one embodiment of the present disclosure is feasible, that is, the first voltage is applied to the cholesteric liquid crystal material for a period of time such that the cholesteric liquid crystal material forms the uniform lying helix arrangement stable state.

Figure 3:
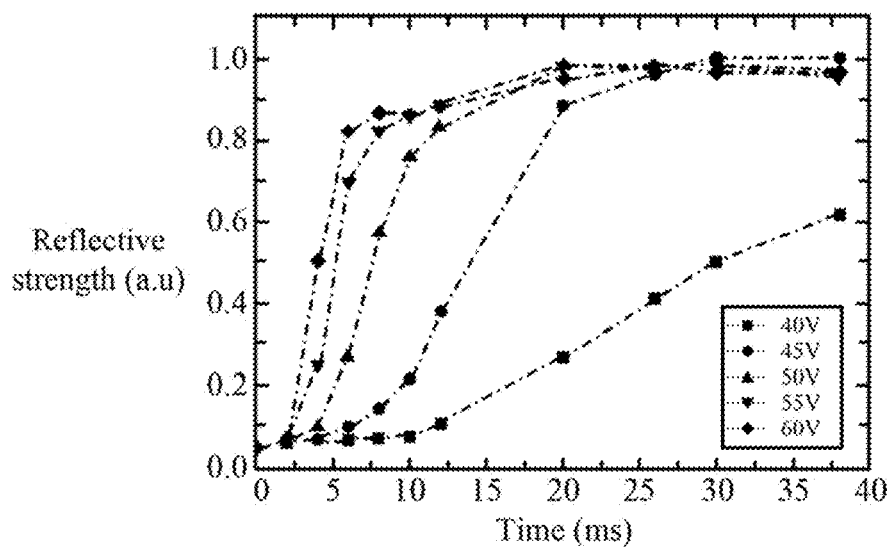
FIG. 3 is a schematic diagram illustrating reflective strength changing over time, after applying different voltages to a cholesteric liquid crystal material being in a uniform lying helix arrangement stable state.

FIG. 3 is a schematic diagram illustrating reflective strength changing over time, after applying different voltages to a cholesteric liquid crystal material being in a uniform lying helix arrangement stable state. FIG. 3 illustrates that, during an initial period of 1 to 3 milliseconds, the cholesterol liquid crystal material is maintained at a relatively low reflective strength at each of the voltages. However, after 3 milliseconds, the reflective strength of the cholesterol liquid crystal material starts to have an obvious change. In other words, the cholesterol liquid crystal material can be maintained in the "transition zone" as described above by providing a suitable second voltage for 1 to 3 milliseconds. It can thus be proved that the step 13 of one embodiment of the present disclosure is feasible.

Figure 4:
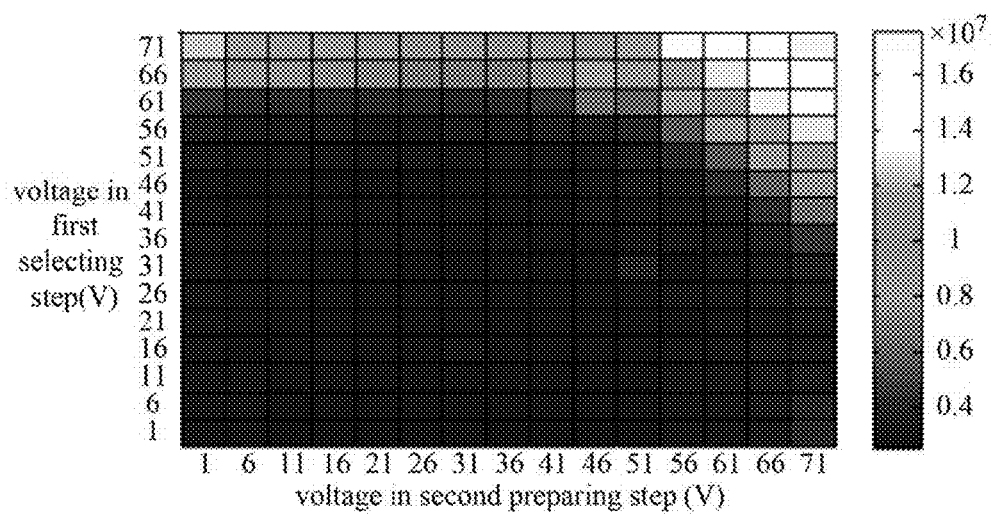
FIG. 4 is a schematic diagram illustrating brightness of a cholesteric liquid crystal material, after applying 21 V for 2 seconds in a first preparing step, applying different voltages (x-axis) for 2 milliseconds in a second preparing step, and applying different voltages (y-axis) for 1 millisecond in a first selecting step, according to one embodiment of the present disclosure.

FIG. 4 is a schematic diagram illustrating brightness of a cholesteric liquid crystal material, after applying 21 V for 2 seconds in a first preparing step, applying different voltages (x-axis) for 2 milliseconds in a second preparing step, and applying different voltages (y-axis) for 1 millisecond in a first selecting step, according to one embodiment of the present disclosure. The color in FIG. 4 means that, when the color is closer to white, brightness of the cholesteric liquid crystal material is higher; and when the color is closer to black, brightness of the cholesteric liquid crystal material is lower (referring to brightness scale at the right side in FIG. 4). FIG. 4 illustrates that, when a voltage (i.e., the second voltage) of the second preparing step is 71 V, brightness of the cholesteric liquid crystal material can be switched by changing voltages of the first selecting step (i.e., stable states of the cholesteric liquid crystal material are changed). It can thus be proved that the first selecting step in the step 14 of one embodiment of the present disclosure is feasible.

Figure 5A:
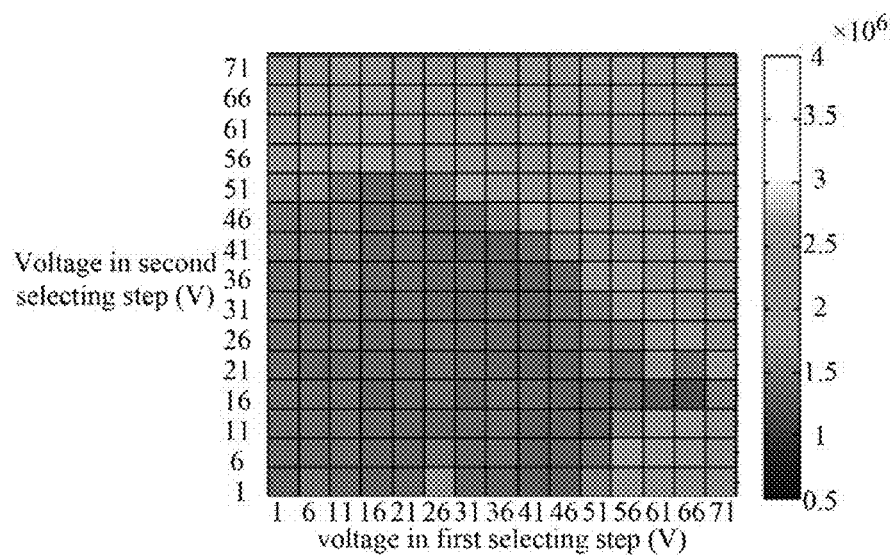
FIG. 5A is a schematic diagram illustrating brightness of a cholesteric liquid crystal material, after applying 21 V for 2 seconds in a first preparing step, applying 71 V for 2 milliseconds in a second preparing step, applying different voltages (x-axis) for 2 milliseconds in a first selecting step, and applying different voltages (y-axis) for 4 millisecond in a second selecting step, according to one embodiment of the present disclosure.
Figure 5B:
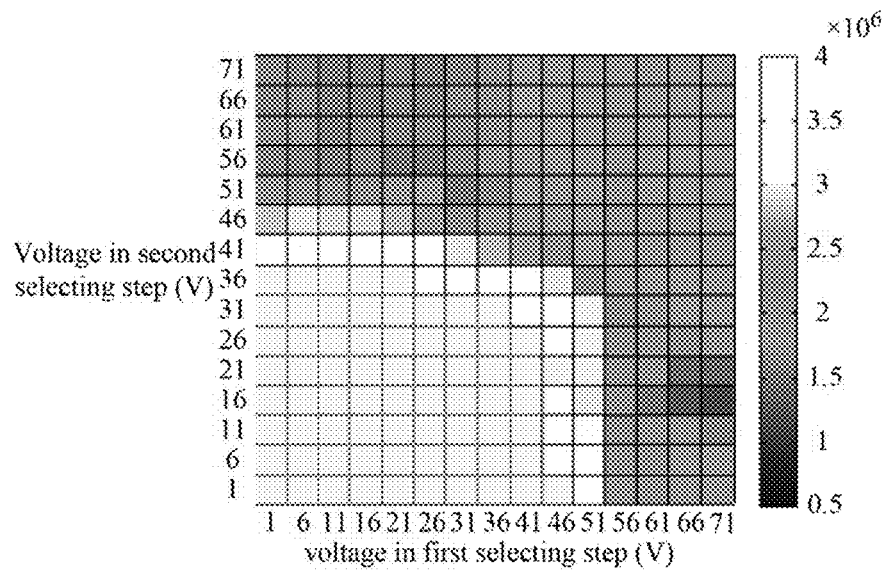
FIG. 5B is a schematic diagram illustrating brightness of the cholesteric liquid crystal material in FIG. 5A, after disposing a polarizer, with a polarizing angle of 45 degrees, on the cholesteric liquid crystal material.

FIG. 5A is a schematic diagram illustrating brightness of a cholesteric liquid crystal material, after applying 21 V for 2 seconds in a first preparing step, applying 71 V for 2 milliseconds in a second preparing step, applying different voltages (x-axis) for 2 milliseconds in a first selecting step, and applying different voltages (y-axis) for 4 millisecond in a second selecting step, according to one embodiment of the present disclosure; and FIG. 5B is a schematic diagram illustrating brightness of the cholesteric liquid crystal material in FIG. 5A, after disposing a polarizer, with a polarizing angle of 45 degrees, on the cholesteric liquid crystal material. Similarly, the color in FIGS. 5A and 5B means that, when the color is closer to white, brightness of the cholesteric liquid crystal material is higher; and when the color is closer to black, brightness of the cholesteric liquid crystal material is lower (referring to brightness scale at the right side in each of FIGS. 5A and 5B).

It is noted that, by comparing brightness between FIG. 5A and FIG. 5B, it can be determined that the stable state of the cholesteric liquid crystal material is the focal-conic arrangement stable state or the uniform lying helix arrangement stable state. This is because the focal-conic arrangement stable state and the uniform lying helix arrangement stable state may have similar brightness, in a condition without disposing a polarizer, with a polarizing angle of 45 degrees, on the cholesteric liquid crystal material (for example, the color is black in FIG. 5A). Therefore, the polarizer can be used to observe changes of brightness. For, example, color blocks in lower left corner in FIG. 5A are black (or dark grey), but color blocks in lower left corner in FIG. 5B are white (or light grey), i.e., the cholesteric liquid crystal material is in the uniform lying helix arrangement stable state. This is because the focal-conic arrangement stable state has a light-scattering characteristic, and the focal-conic arrangement stable state would not have obvious brightness changes even if the polarizer with a specific polarizing angle exists (such as a color block located at 66 V on the x-axis and at 16 V on the y-axis, in each of FIGS. 5A and 5B). Conversely, the uniform lying helix arrangement stable state would have brightness changes when the polarizer with a specific polarizing angle exists, due to its characteristic of optically uniaxial crystal.

According to FIGS. 1, 5A, and 5B, in the second selecting step 15, brightness of the cholesteric liquid crystal material can be changed by selecting a voltage used in the second selecting step. In one embodiment, when the voltage of the second selecting step 15 ranges from about 16 V to about 60 V (i.e., the fourth voltage), the cholesteric liquid crystal material is in the focal-conic arrangement stable state. In another embodiment, when the voltage of the second selecting step 15 ranges from about 61 V to about 71 V (i.e., the second voltage), the cholesteric liquid crystal material is in the planar arrangement stable state.

From above, a dynamic driving method of tri-stable cholesteric liquid crystals according one embodiment of the present disclosure can switch three stable states of the cholesteric liquid crystal material, and a switching time among the three stable states (such as driven by a passive matrix method) is reduced effectively.

In one embodiment, the first voltage is 21 V and the second voltage is 71V, and the three stable states of the cholesteric liquid crystal material are switched by following steps.

In one embodiment, when the first selecting result is the uniform lying helix arrangement stable state, the third voltage is applied to the cholesteric liquid crystal material for 5 milliseconds, and a fifth voltage is further applied to the cholesteric liquid crystal material for 5 milliseconds, such that the cholesteric liquid crystal material returns to the uniform lying helix arrangement stable state from the transition zone, wherein the third voltage is 21 V and the fifth voltage ranges from 11 V to 36 V. In one embodiment, the fifth voltage is 21 V. In a specific example, a schematic diagram illustrating a voltage applied to the cholesteric liquid crystal material over time for forming the uniform lying helix arrangement stable state, can be illustrated in FIG. 6A.

In one embodiment, when the first selecting result is the vertical alignment unstable state, the second voltage is applied to the cholesteric liquid crystal material for 2 milliseconds, and when the second selecting result is the focal-conic arrangement stable state, the fourth voltage is applied to the choiesteric liquid crystal material for 3 milliseconds and a fifth voltage is further applied to the cholesteric liquid crystal material for 5 milliseconds, such that the cholesteric liquid crystal material transforms into the focal-conic arrangement stable state from the vertical alignment unstable state, wherein the fourth voltage is 21 V and the fifth voltage ranges from 11 V to 36 V. In one embodiment, the fifth voltage is 21 V. In a specific example, a schematic diagram illustrating a voltage applied to the cholesteric liquid crystal material over time for forming the focal-conic arrangement stable state, can be illustrated in FIG. 6B.

In one embodiment, when the first selecting result is the vertical alignment unstable state, the second voltage is applied to the cholesteric liquid crystal material for 2 milliseconds, and when the second selecting result is the planar arrangement stable state, the second voltage is applied to the cholesteric liquid crystal material for 3 milliseconds and a fifth voltage is further applied to the cholesteric liquid crystal material for 5 milliseconds, such that the cholesteric liquid crystal material transforms into the planar arrangement stable state from the vertical alignment unstable state, wherein the fifth voltage ranges from 11 V to 36 V. In one embodiment, the fifth voltage is 21 V. In a specific example, a schematic diagram illustrating a voltage applied to the cholesteric liquid crystal material over time for forming the planar arrangement stable state, can be illustrated in FIG. 6C.

Figure 6A:
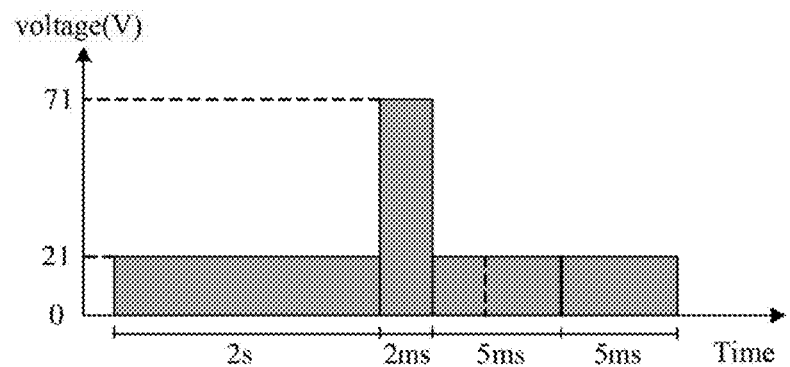
FIG. 6A is a schematic diagram illustrating a voltage applied to a cholesteric liquid crystal material over time for forming a uniform lying helix arrangement stable state.
Figure 6B:
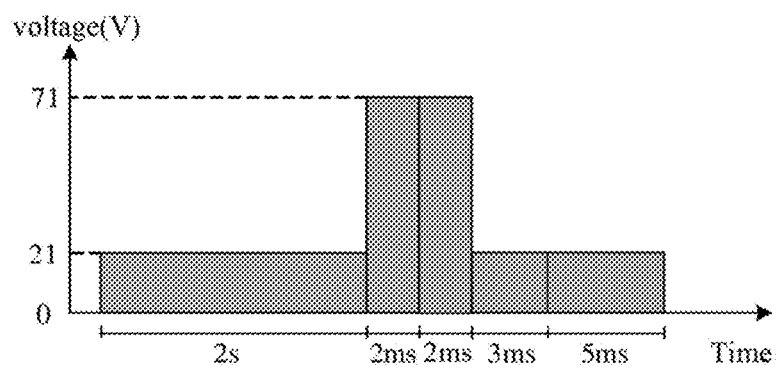
FIG. 6B is a schematic diagram illustrating a voltage applied to a cholesteric liquid crystal material over time for forming a focal-conic arrangement stable state.
Figure 6C:
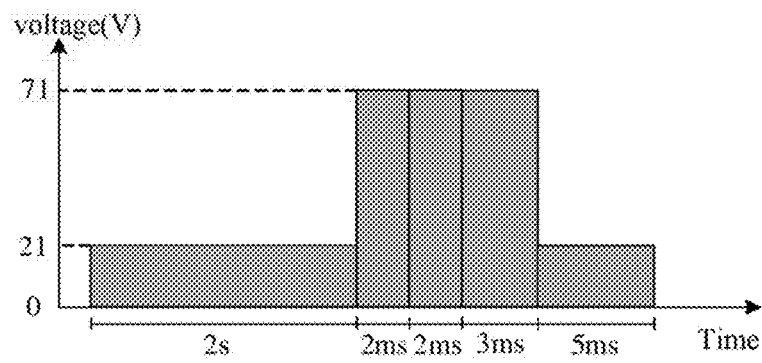
FIG. 6C is a schematic diagram illustrating a voltage applied to a cholesteric liquid crystal material over time for forming a planar arrangement stable state.

From FIGS. 6A to 6C, voltages used to control the cholesteric liquid crystal material can be simplified to two voltages, i.e.,, voltage values of 21 V and 71 V. It means that the three stable states of the cholesteric liquid crystal material can be switched by adjusting a duration of the two voltages. It is noted that, in one embodiment, since the fifth voltage is applied to the cholesteric liquid crystal material for 5 milliseconds in a final stage in each of the stable states, the stable state of the cholesteric liquid crystal material is determined at a time before the fifth voltage is applied. For example, before the fifth voltage is applied, the third voltage (such as 21 V) is applied to the cholesteric liquid crystal material for 5 milliseconds, and the stable state of the cholesteric liquid crystal material can be determined to be the uniform lying helix stable state. For example, before the fifth voltage is applied, the second voltage (such as 71 V) is applied to the cholesteric liquid crystal material for 2 milliseconds, and the fourth voltage (such as 21 V) is applied to the cholesteric liquid crystal material for 3 milliseconds, and the stable state of the cholesteric liquid crystal material can be determined to be the focal-conic arrangement stable state. For example, before the fifth voltage is applied, the second voltage (such as 71 V) is applied to the cholesteric liquid crystal material for 5 milliseconds, and the stable state of the cholesteric liquid crystal material can be determined to be the planar arrangement stable state.

It is noted that, a dotted line shown in FIG. 6A is, for example, used to divide a time for which the third voltage is applied into two time intervals including 2 milliseconds and 3 milliseconds. The two time intervals in FIG. 6A can be used to correspond to time intervals in FIGS. 6B and 6C.

Feasibility of the dynamic driving method of the tri-stable cholesteric liquid crystals according to another embodiment of the present disclosure is described below.

Figure 7A:
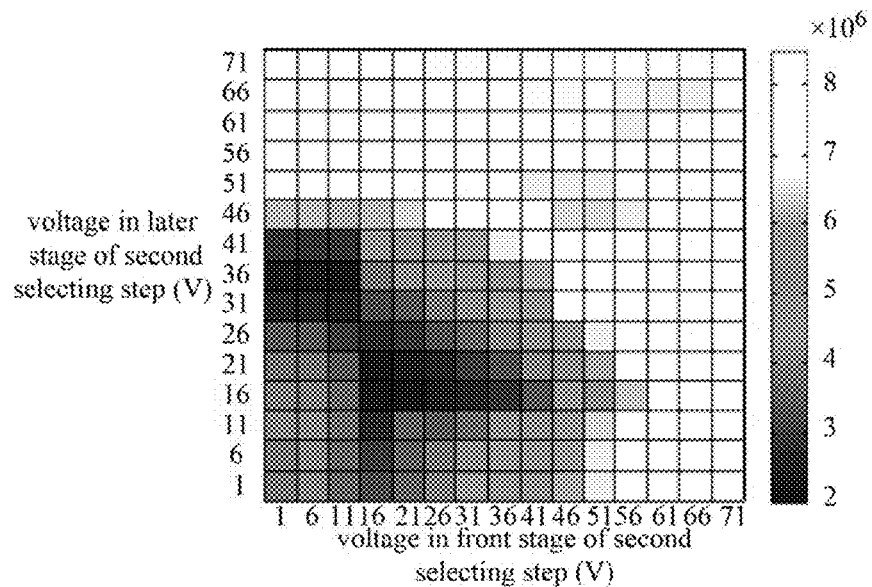
FIG. 7A is a schematic diagram illustrating brightness of a cholesteric liquid crystal material, after applying 21 V for 2 seconds in a first preparing step, applying 71 V for 2 milliseconds in a second preparing step, applying 71 V for 2 milliseconds in a first selecting step, applying different voltages (x-axis) for 3 milliseconds in a second selecting step, and applying different voltages (y-axis) for 5 millisecond, according to one embodiment of the present disclosure.
Figure 7B:
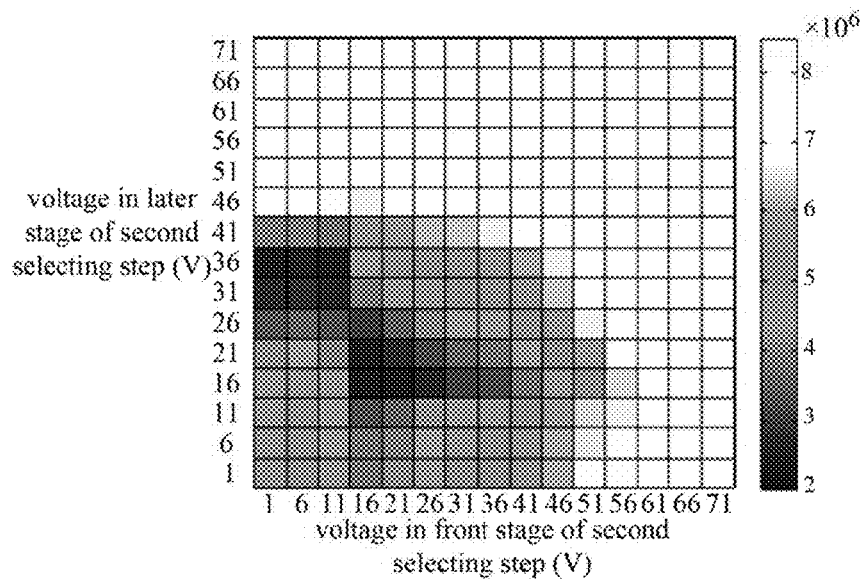
FIG. 7B is a schematic diagram illustrating brightness of the cholesteric liquid crystal material in FIG. 7A, after disposing a polarizer, with a polarizing angle of 45 degrees, on the cholesteric liquid crystal material.

FIG. 7A is a schematic diagram illustrating brightness of a cholesteric liquid crystal material, after applying 21 V for 2 seconds in a first preparing step, applying 71 V for 2 milliseconds in a second preparing step, applying 71 V for 2 milliseconds in a first selecting step, applying different voltages (x-axis) for 3 milliseconds in a second selecting step, and applying different voltages (y-axis) for 5 millisecond, according to one embodiment of the present disclosure; and FIG. 7B is a schematic diagram illustrating brightness of the cholesteric liquid crystal material in FIG. 7A, after disposing a polarizer, with a polarizing angle of 45 degrees, on the cholesteric liquid crystal material. Similarly, the color in FIGS. 7A and 7B means that, when the color is closer to white, brightness of the cholesteric liquid crystal material is higher; and when the color is closer to black, brightness of the cholesteric liquid crystal material is lower (referring to brightness scale at the right side in each of FIGS. 7A and 7B).

Since a voltage of 71 V is applied in the first selecting step for 2 milliseconds, a next step is to select the focal-conic arrangement stable state or the plane arrangement stable state. FIGS. 7A and 7B illustrate that, in the second selecting step, when 21 V is applied for 3 milliseconds and then a voltage ranging from 11 V to 36 V is applied for 5 milliseconds, brightness shown both in FIGS. 7A and 7B is black or dark grey (i.e., the cholesteric liquid crystal material is in the focal-conic arrangement stable state). In another aspect, in the second selecting step, when 71 V is applied for 3 milliseconds and then a voltage ranging from 11 V to 36 V is applied for 5 milliseconds, brightness shown both in FIGS. 7A and 7B is white or light grey (i.e., the cholesteric liquid crystal material is in the planar arrangement stable state).

Figure 8A:
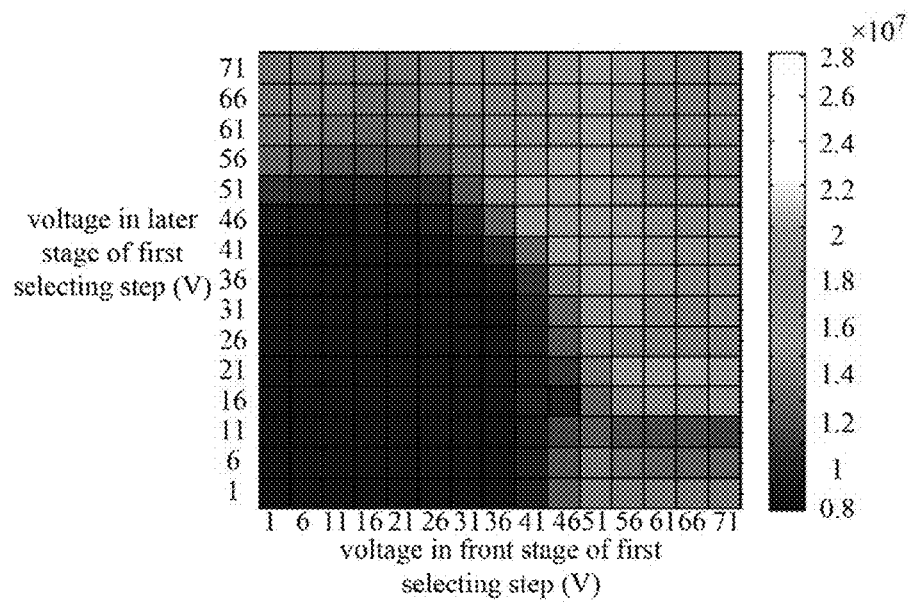
FIG. 8A is a schematic diagram illustrating brightness of a cholesteric liquid crystal material, after applying 21 V for 2 seconds in a first preparing step, applying 71 V for 2 milliseconds in a second preparing step, applying different voltages (x-axis) for 5 milliseconds in a first selecting step, and applying different voltages (y-axis) for 5 millisecond in a second selecting step, according to one embodiment of the present disclosure.
Figure 8B:
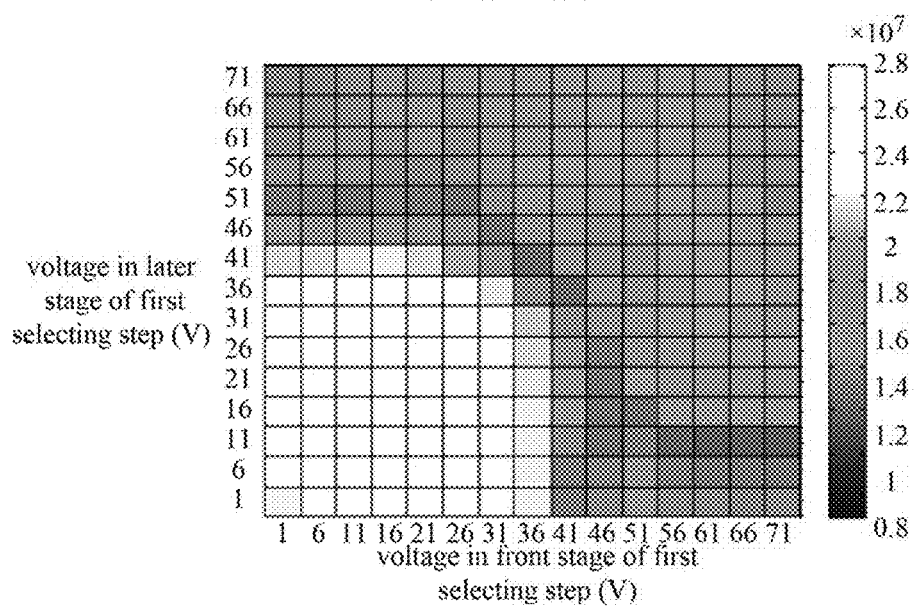
FIG. 8B is a schematic diagram illustrating brightness of the cholesteric liquid crystal material in FIG. 8A, after disposing a polarizer, with a polarizing angle of 45 degrees, on the cholesteric liquid crystal material.

FIG. 8A is a schematic diagram illustrating brightness of a cholesteric liquid crystal material, after applying 21 V for 2 seconds in a first preparing step, applying 71 V for 2 milliseconds in a second preparing step, applying different voltages (x-axis) for 5 milliseconds in a first selecting step, and applying different voltages (y-axis) for 5 millisecond in a second selecting step, according to one embodiment of the present disclosure; and FIG. 8B is a schematic diagram illustrating brightness of the cholesteric liquid crystal material in FIG. 8A, after disposing a polarizer, with a polarizing angle of 45 degrees, on the cholesteric liquid crystal material. Similarly, the color in FIGS. 8A and 8B means that, when the color is closer to white, brightness of the cholesteric liquid crystal material is higher; and when the color is closer to black, brightness of the cholesteric liquid crystal material is lower (referring to brightness scale at the right side in each of FIGS. 8A and 8B).

FIGS. 8A and 8B illustrate that, in the first selecting step, when 21 V is applied for 5 milliseconds and then a voltage ranging from 11 V to 36 V is applied for 5 milliseconds, brightness shown in FIG. 8A is black or dark grey but brightness shown in FIG. 8B is white or light grey. Therefore, it is confirmed that the cholesteric liquid crystal material is in the uniform lying helix arrangement stable state.

From above, a dynamic driving method of tri-stable cholestric liquid crystals according another embodiment of the present disclosure can switch three stable states of the cholesteric liquid crystal material, and a switching time among the three stable states (such as driven by a passive matrix method) is reduced effectively.

The present disclosure has been described with a preferred embodiment thereof and it is understood that many changes and modifications to the described embodiment can be carried out without departing from the scope and the spirit of the disclosure that is intended to be limited only by the appended claims.

What is claimed is:
1. A dynamic driving method of tri-stable cholesteric liquid crystals, comprising steps of:
providing a tri-stable cholesteric liquid crystal device comprising: a cholesteric liquid crystal material with at least three stable states; and chiral molecules, wherein the at least three stable states comprises a planar arrangement stable state, a focal-conic arrangement stable state, and an uniform lying helix arrangement stable state;

performing a first preparing step, wherein a first voltage is applied to the cholesteric liquid crystal material for 1.5 to 2.5 seconds, such that the cholesteric liquid crystal material is in the uniform lying helix arrangement stable state;

performing a second preparing step, wherein a second voltage is applied to the cholesteric liquid crystal material for 1 to 3 milliseconds, such that the cholesteric liquid crystal material is in a transition zone between the uniform lying helix arrangement stable state and a vertical alignment unstable state, wherein the second voltage is greater than the first voltage; and performing a first selecting step to select one of the uniform lying helix arrangement stable state and the vertical alignment unstable state as a first selecting result, wherein:

when the first selecting result is the uniform lying helix arrangement stable state, a third voltage is applied to the cholesteric liquid crystal material for 5 to 12 milliseconds, such that the cholesteric liquid crystal material returns to the uniform lying helix arrangement stable state from the transition zone, wherein the third voltage is less than the second voltage; or when the first selecting result is the vertical alignment unstable state, the second voltage is further applied to the cholesteric liquid crystal material for 2 to 4 milliseconds, such that the cholesteric liquid crystal material transforms into the vertical alignment unstable state, and then a second selecting step is performed to select one of the planar arrangement stable state and the focal-conic arrangement stable state as a second selecting result, wherein:

when the second selecting result is the focal-conic arrangement stable state, a fourth voltage is applied to the cholesteric liquid crystal material for 3 to 8 milliseconds, such that the cholesteric liquid crystal material transforms into the focal-conic arrangement stable state from the vertical alignment unstable state, wherein the fourth voltage is less than the second voltage; or when the second selecting result is the planar arrangement stable state, the second voltage is further applied to the cholesteric liquid crystal material for 3 to 8 milliseconds, such that the cholesteric liquid crystal material transforms into the planar arrangement stable state from the vertical alignment unstable state.

2. The dynamic driving method of the tri-stable cholesteric liquid crystals according to claim 1, wherein the first voltage ranges from 20 V to 30 V, the second voltage ranges from 61 V to 71 V, the third voltage ranges from 16 V to 26 V, and the fourth voltage ranges from 16 V to 60 V.

3. The dynamic driving method of the tri-stable cholesteric liquid crystals according to claim 1, wherein the first voltage is 21 V and the second voltage is 71 V.

4. The dynamic driving method of the tri-stable cholesteric liquid crystals according to claim 3, wherein in the first selecting step, when the first selecting result is the uniform lying helix arrangement stable state, the third voltage is applied to the cholesteric liquid crystal material for 5 milliseconds, and a fifth voltage is further applied to the cholesteric liquid crystal material for 5 milliseconds, such that the cholesteric liquid crystal material returns to the uniform lying helix arrangement stable state from the transition zone, wherein the third voltage is 21 V and the fifth voltage reanges from 11 V to 36 V.

5. The dynamic driving method of the tri-stable cholesteric liquid crystals according to claim 4, wherein the fifth voltage is 21 V.

6. The dynamic driving method of the tri-stable cholesteric liquid crystals according to claim 3, wherein in the second selecting step, when the second selecting result is the focal-conic arrangement stable state, the fourth voltage is applied to the cholesteric liquid crystal material for 3 milliseconds and a fifth voltage is further applied to the cholesteric crystal material for 5 milliseconds, such that the cholestenic liquid crystal material transforms into the focal-conic arrangement stable state from the vertical alignment unstable state, wherein the fourth voltage is 21 V and the fifth voltage ranges from 11 V to 36 V.

7. The dynamic driving method of the tri-stable cholesteric liquid crystals according to claim 6, wherein the fifth voltage is 21 V.

8. The dynamic driving method of the tri-stable cholesteric liquid crystals according to claim 3, wherein in the second selecting step, when the second selecting result is the planar arrangement stable state, the second voltage is applied to the cholesteric liquid crystal material for 3 milliseconds and a fifth voltage is further applied to the cholesteric liquid crystal material for 5 milliseconds, such that the cholesteric liquid crystal material transforms into the planar arrangement stable state from the vertical alignment unstable state, wherein the fifth voltage ranges from 11 V to 36 V.

9. The dynamic driving method of the tri-stable cholesteric liquid crystals according to claim 8, wherein the fifth voltage is 21 V.

10. The dynamic driving method of the tri-stable cholesteric liquid crystals according to claim 1, wherein the chiral molecules are selected from a group consisting of chiral molecules S811, chiral molecules R811, chiral molecules S1011, chiral molecules R1011, chiral molecules S5011, and chiral molecules R5011.

* * * * *